A. J. ROBERTSON.
BRAKE.
APPLICATION FILED APR. 10, 1916.
1,200,139.
Patented Oct. 3, 1916.
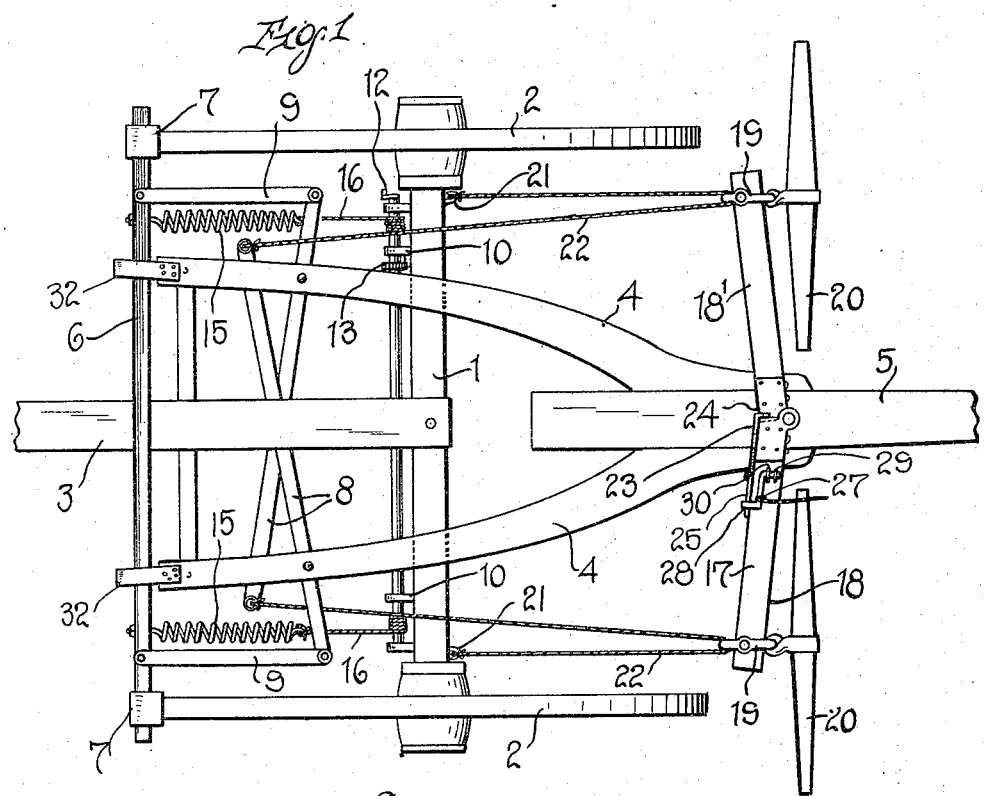
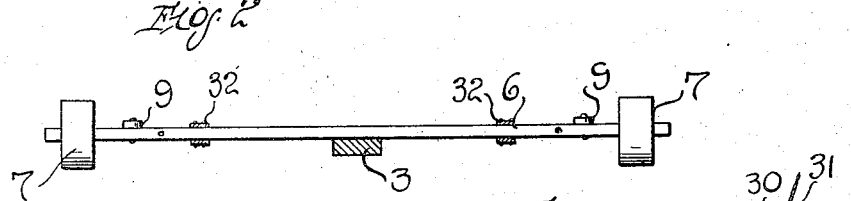
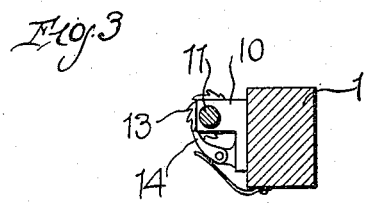
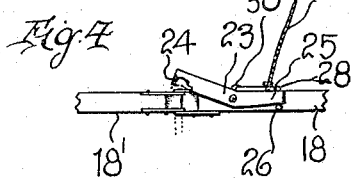
Inventor
A. J. Robertson
Witnesses
Robert M. Sutphen
A. I. Hind
By Watson E. Coleman
Attorney

UNITED STATES PATENT OFFICE.

ARTHUR J. ROBERTSON, OF HARDIN, KENTUCKY.

BRAKE.

1,200,139. Specification of Letters Patent. Patented Oct. 3, 1916.

Application filed April 10, 1916. Serial No. 90,247.

*To all whom it may concern:*

Be it known that I, ARTHUR J. ROBERTSON, a citizen of the United States, residing at Hardin, in the county of Marshall and State of Kentucky, have invented certain new and useful Improvements in Brakes, of which the following is a specification, reference being had to the accompanying drawings.

This invention relates to improvements in brakes and particularly to that class of brakes which are connected to the running gear of a heavy wagon or like vehicle.

An object of this invention is the provision of a brake which includes a slidable brake beam having brake shoes mounted on its opposite ends for engagement against the wheels of the running gear, the brake beam being operatively connected to a jointed whiffletree, and means being provided to normally maintain the brake shoes in spaced relation with the wheels when the draft animals are exerting a pull upon the whiffletree.

Another object of this invention is the provision of a brake of this character, in which means are provided to automatically move the brake shoes against the wheels upon back pressure of the draft animals upon the sections of the jointed whiffletree.

Still another object of this invention is the provision of a brake which includes a brake beam and a jointed whiffletree, the brake beam being connected to the axle by contractile springs which normally tend to force the brake shoes against the wheels of the running gear when back pressure is applied to the sections of the whiffletree, means being provided to adjust the tension of the springs which connect the brake beam to the axle.

With these and other objects in view, my invention consists in the novel construction, combination, and arrangement of parts to be hereinafter more fully described, claimed and illustrated in the accompanying drawing, in which, Figure 1 is a top plan view of my invention; Fig. 2 is a transverse sectional view through the bolster showing the brake beam slidably connected thereto; Fig. 3 is a transverse sectional view through the axle showing the mechanism connected thereto for adjusting the tension of the springs connected to the brake beam, and Fig. 4 is a fragmentary side elevational view of the whiffletree showing the locking end of the lever disposed above the opposing ends of the sections of the whiffletree.

Referring more particularly to the drawing, my improved brake mechanism is connected to the running gear of a wagon of ordinary construction which includes an axle 1 upon the opposite ends of which the wheels 2 are mounted, a reach 3, and the hounds 4 between the forward ends of which the tongue 5 is connected. Slidably mounted on the reach 3 in parallel relation with the axle 1, is a brake beam 6 which has secured to its opposite ends the brake shoes 7 which are adapted for engagement against the peripheries of the wheels 2. Pivotally connected to the hounds 4 forwardly of the brake beam 6, is a pair of crossed levers 8, each of the levers being connected at one end to the brake beam by a link 9. Rotatably mounted in suitable rearwardly extending brackets 10 carried by the axle 1, is a shaft 11, the shaft 11 being provided with a detachable winding crank 12 at one end and a ratchet wheel 13 with which a pawl 14 mounted upon the axle 1 is adapted to engage, to prevent rotation of the shaft 11 in one direction.

Connected to the brake beam 6, adjacent each end thereof, is a contractile spring 15, the springs being connected at their forward ends to wire cords 16 which are wound on the shaft 11 to adjust the tension of the springs 15 which normally serve to draw the brake beam forwardly to engage the brake shoes 7 against the peripheries of the wheels 2. Connected to the tongue 5, forwardly of the wheels, is a jointed whiffletree 17 which comprises a pair of sections 18 and 18' pivotally connected together at their adjacent ends, the outer end of each section carrying a clevis 19 to which a swingletree 20 is connected to which draft animals are connected on opposite sides of the tongue 5. To connect the sections of the whiffletree to the free ends of the crossed levers 8, forwardly extending hooks 21 are carried by the axle 1 in longitudinal alinement with the outer ends of the sections of the whiffletree, operating cables 22 being connected at one end to the hooks 21, the cables extending forwardly and being passed through the clevises 19 and thence rearwardly and connected to the free ends of the levers 8. Pivotally connected intermediate of its ends to the section 18 of the whiffletree is a lever 23, the lever being bent intermediate of its ends, so that the ends thereof extend angularly with relation to each other, whereby one end of the lever will always be disposed above the plane of the whiffletree. One end of the lever 23 is provided with a laterally extending portion 24 which is normally disposed above the plane of the whiffletree, and secured in the section 18 of the whiffletree below the handle portion 25 of the lever is an outwardly extending pin 26 which limits the downward movement of the handle end of the lever. A trip rod 27 is arranged on the upper face of the section 18 of the whiffletree, the rod having oppositely disposed ends 28 and 29, the end 29 being hingedly mounted in loops 30 secured in the upper face of the section 18 in transverse alinement with the pivot pin of the lever 23. The opposite end 28 of the trip projects beyond the inner edge of the section 18, so that when the trip is thrown back or forth, the end 28 thereof engages the upper edge of the lever at either end of the same, the trip being operated by a suitable cord 31 which extends upwardly to the driver's seat (not shown), of the wagon. Connected to the rear end of each hound 4 are the free ends of a U-shaped guide 32, the brake beam 6 being slidably disposed within the guide so that the beam is held in position relative to the wheels of the wagon.

The operation of my improved mechanism is as follows:—Presuming that the draft animals connected to the swingletrees 20 are drawing the wagon over the ground, the sections of the whiffletree are held in longitudinal alinement with each other, thereby drawing the free ends of the levers 8 forwardly by means of the operating cables 22, by means of which the brake beam 6 is moved rearwardly against the tension of the springs 15 to hold the brake shoes 7 in spaced relation with the wheels. When the sections of the whiffletree are in their longitudinal alinement, the trip 27 may be thrown so that the end 28 thereof engages against the free end of the lever 28 to throw the bent extremity 24 thereof downwardly between the opposing ends of the sections, thereby locking the same in longitudinal alinement to maintain the brake beam in inoperative position. When it is again desired to cause the brake mechanism to operate automatically, the trip 27 is thrown in the opposite direction to engage the end 28 thereof against the handle portion 25 of the locking lever so as to raise the end 24 of the lever from between the opposing ends of the sections. With the locking lever in this position, it will be seen that when the draft animals are checked to arrest the movement of the wagon, the sections of the whiffletree are moved rearwardly, thereby allowing the operating cable to become slack and the brake beam to move forwardly by the action of the contractile springs 15 which forces the brake shoes 7 against the wheels to quickly stop the movement of the wagon. It will be readily seen that the tension of the springs 15 may be regulated by rotation of the shaft 11, the springs being mantained at any desired tension by engagement of the pawl 14 with the ratchet wheel 13 on the shaft. When the draft animals again move forwardly to draw the wagon over the ground, the free ends of the levers 8 are moved forwardly through the medium of the operating cables 22 and the brake beam 6 is moved rearwardly to space the shoes 7 from the wheels.

Having thus fully described my invention, what I desire to claim and secure by Letters Patent, is:—

1. In a brake mechanism, the combination with the running gear of a vehicle, said running gear including an axle, and wheels mounted on the opposite ends of said axle; of a brake beam slidably mounted on said running gear rearwardly of the wheels, said brake beam carrying brake shoes for engagement against said wheels, means carried by said axle for engagement with said brake beam to normally draw the same forwardly and engage said brake shoes against the wheels, a jointed whiffletree mounted on said running gear forwardly of the wheels, and means for holding said brake shoes in spaced relation with said wheels when the sections of said whiffletree are disposed in longitudinal alinement with each other.

2. In a brake mechanism, the combination with the running gear of a vehicle including an axle having wheels mounted upon its opposite ends, of a jointed whiffletree connected to the running gear forwardly of the wheels, means for holding the sections of said jointed whiffletree in longitudinal alinement with each other, a brake beam slidably mounted upon said running gear rearwardly of the wheels, brake shoes carried by said beam for engagement with said wheels, and means for automatically moving said brake shoes against said wheels upon rearward movement of the outer ends of the sections of said whiffletree.

3. In a brake mechanism, the combination with the running gear of a vehicle including an axle having wheels mounted upon its opposite ends, a jointed whiffletree connected to the running gear forwardly of the wheels, means for holding the sections of said jointed whiffletree in longitudinal alinement with each other, a brake beam slidably mounted upon the running gear rearwardly of the wheels, brake shoes carried by said brake beam for engagement with the wheels, means for normally holding said brake shoes in spaced relation with said wheels when the sections of said whiffletree are in longitudinal alinement with each other, contractile springs connected to said brake beam and said axle for automatically engaging the brake shoes against said wheels upon rearward movement of the outer ends of the sections of the whiffletree, and means for adjusting the tension of said springs.

4. In a brake mechanism, the combination with the running gear of a vehicle, a brake beam slidably mounted on the running gear rearwardly of the wheels, a jointed whiffletree connected to the running gear forwardly of the wheels, means for forcing the brake shoes carried by said beam into engagement with the wheels upon rearward movement of the outer ends of the sections of the whiffletree, and means for holding the sections of the whiffletree in longitudinal alinement with each other.

In testimony whereof I hereunto affix my signature in the presence of two witnesses.

ARTHUR J. ROBERTSON.

Witnesses:
B. T. CRESS,
W. K. JEFFERY.

Copies of this patent may be obtained for five cents each, by addressing the "Commissioner of Patents, Washington, D. C."